(12) United States Patent
Choe et al.

(10) Patent No.: US 11,761,142 B2
(45) Date of Patent: Sep. 19, 2023

(54) METHOD FOR CONTROLLING LAUNDRY TREATMENT APPARATUS

(71) Applicant: LG Electronics Inc., Seoul (KR)

(72) Inventors: Woonje Choe, Seoul (KR); Nagyoung Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 402 days.

(21) Appl. No.: 17/179,802

(22) Filed: Feb. 19, 2021

(65) Prior Publication Data

US 2021/0262154 A1 Aug. 26, 2021

(30) Foreign Application Priority Data

Feb. 20, 2020 (KR) .......................... 10-2020-0021057

(51) Int. Cl.
*D06F 58/44* (2020.01)
*D06F 58/20* (2006.01)
(Continued)

(52) U.S. Cl.
CPC ............ *D06F 58/44* (2020.02); *D06F 58/203* (2013.01); *D06F 58/206* (2013.01);
(Continued)

(58) Field of Classification Search
CPC ...... D06F 58/44; D06F 58/203; D06F 58/206; D06F 2105/48; D06F 2105/30; D06F 2105/40; D06F 2105/26
(Continued)

(56) References Cited

U.S. PATENT DOCUMENTS 8,383,035 B2 * 2/2013 Kim .................. D06F 58/30
34/607
8,839,647 B2 * 9/2014 Kappler ................. D06F 73/02
68/5 R
(Continued)

FOREIGN PATENT DOCUMENTS

CN 1037557 11/1989
CN 1944767 4/2007
(Continued)

OTHER PUBLICATIONS

Office Action in Chinese Appln. No. 202110192121.0, dated Oct. 27, 2022, 15 pages (with English translation).
(Continued)

*Primary Examiner* — Stephen M Gravini
(74) *Attorney, Agent, or Firm* — Fish & Richardson P.C.

(57) ABSTRACT

A method controls a laundry treatment apparatus that includes a drum in which a target object to be dried is put, a drum motor to drive the drum, an air duct to guide air into the drum, a heat pump provided in the air duct to dehumidify and heat the air, a blower fan to move the air of the air duct, and a blower motor to drive the blower fan. The method includes a drum driving step for repeatedly driving the drum by accelerating and decelerating the drum, a steam supply step for supplying or stopping steam for a predetermined time during execution of the drum driving step, and an air supply step for circulating internal air of the drum during execution of the drum driving step. The circulation of the internal air of the drum is stopped during execution of the steam supply step.

20 Claims, 7 Drawing Sheets

(51) Int. Cl.
*D06F 105/48* (2020.01)
*D06F 105/30* (2020.01)
*D06F 105/40* (2020.01)
*D06F 105/26* (2020.01)

(52) U.S. Cl.
CPC ...... *D06F 2105/26* (2020.02); *D06F 2105/30* (2020.02); *D06F 2105/40* (2020.02); *D06F 2105/48* (2020.02)

(58) Field of Classification Search
USPC ............................................ 34/427, 595–610
See application file for complete search history.

(56) References Cited

U.S. PATENT DOCUMENTS

| | | | | |
|---|---|---|---|---|
| 9,752,270 | B2 * | 9/2017 | Chae | D06F 57/00 |
| 10,392,740 | B2 * | 8/2019 | Chernetski | D06F 58/10 |
| 2021/0262154 | A1 * | 8/2021 | Choe | D06F 58/44 |
| 2021/0277586 | A1 * | 9/2021 | Choe | D06F 34/26 |

FOREIGN PATENT DOCUMENTS

| | | | |
|---|---|---|---|
| CN | 101240501 | 8/2008 | |
| CN | 102099523 | 6/2011 | |
| CN | 102277714 | 12/2011 | |
| CN | 105986451 | 10/2016 | |
| CN | 107663760 | 2/2018 | |
| EP | 1852541 | 11/2007 | |
| EP | 2341181 | 7/2011 | |
| EP | 2390404 | 11/2011 | |
| EP | 2152949 B1 * | 8/2012 | ............ D06F 25/00 |
| EP | 3276071 | 1/2018 | |
| JP | 2009-291233 | 12/2009 | |
| WO | WO-2009008560 A1 * | 1/2009 | ............ D06F 25/00 |

OTHER PUBLICATIONS

Extended European Search Report in European Appln. No. 21157210.2, dated Jul. 12, 2021, 6 pages.

* cited by examiner

METHOD FOR CONTROLLING LAUNDRY TREATMENT APPARATUS

CROSS-REFERENCE TO RELATED APPLICATIONS

This application claims the benefit of Korean Patent Application No. 10-2020-0021057, filed on Feb. 20, 2020, which is hereby incorporated by reference as if fully set forth herein.

TECHNICAL FIELD

The present disclosure relates to a method for controlling a laundry treatment apparatus, and more particularly to a control method for drying bedclothes in a laundry treatment apparatus including a steam generator.

BACKGROUND

Generally, a laundry treatment apparatus may refer to an apparatus for washing laundry, an apparatus for drying wet or washed laundry, and/or an apparatus for performing washing and drying of laundry. Here, the laundry treatment apparatus may perform only a washing or drying function of laundry, or may perform both washing and drying functions of laundry.

For example, a drum-type drying machine for drying wet or washed laundry, a cabinet-type drying machine for hanging laundry and drying hung laundry, and a refresher for refreshing laundry by supplying air to laundry, etc. have been developed.

The refresher or the drying machine from among the laundry treatment apparatuses includes a heat source supply unit to supply hot air to laundry.

The heat source supply unit has been implemented as various kinds of heat source supply units, for example, a gas-type heater for heating air by burning gas using heat sources, an electric heater for heating air using electric resistance, a heat pump for heating air using a heat pump unit in which refrigerant circulates a compressor, a condenser, an expansion valve, and an evaporator, etc. In recent times, an enhanced heat pump having excellent energy efficiency has been actively developed.

Meanwhile, a laundry drying machine provided with a heat pump includes a drum, a drive motor, a compressor, a condenser, etc. in a cabinet. The drum includes a cylindrical space to accommodate and dry laundry. A space occupied by the drum from among the entire space inside the cabinet is much larger than other constituent components.

The compressor, the condenser, the expansion valve, and the evaporator constituting a heat-pump cycle are arranged in the remaining spaces except for the space occupied by the drum. Here, the remaining spaces except for the space occupied by the drum may be the left and right side spaces of the cabinet.

For example, the evaporator and the condenser may be disposed at front and rear sides in one side space of the cabinet. The compressor having a relatively large volume and size may be disposed in the other side edge space of the cabinet.

The above-mentioned laundry treatment apparatus using a heat pump may be constructed in a manner that moisture of humid air passing through the evaporator is condensed on the surface of the evaporator according to operation of the heat pump, condensate water condensed on the surface of the evaporator is collected by weight of the condensate water, and the collected condensate water is separately drained outside.

Recently, an enhanced laundry treatment apparatus having a refresh function, which is implemented by adding a separate steam generator to the above-mentioned laundry treatment apparatus having the heat pump, has been developed and rapidly come into widespread use. Here, the refresh function can dry target laundry using hot water generated by a heat pump and steam generated by a steam generator, and at the same time can perform wrinkle removal, deodorization, static electricity removal, etc. of the target laundry.

Meanwhile, according to a method for controlling the above-mentioned laundry treatment apparatus, a separate process for supplying steam is not yet performed when drying target laundry including bedclothes such as a blanket.

Accordingly, when drying bedclothes, in order to dry bedclothes as well as to obtain the refresh effects such as wrinkle removal, deodorization, static electricity removal, dust removal, sterilization, etc. of the bedclothes, a control process of supplying steam to the bedclothes is required to perform drying.

SUMMARY

Accordingly, the present disclosure is directed to a method for controlling a laundry treatment apparatus that substantially obviates one or more problems due to limitations and disadvantages of the related art.

An object of the present disclosure is to provide a method for controlling a laundry treatment apparatus configured to supply steam to bedclothes when drying the bedclothes such as a blanket, which can dry bedclothes using steam, and at the same time can perform wrinkle removal, deodorization, static electricity removal, dust removal, sterilization, etc. of the bedclothes using steam.

Another object of the present disclosure is to provide a method for controlling a laundry treatment apparatus configured to supply steam to bedclothes when drying the bedclothes such as a blanket, which enables an internal temperature of the bedclothes to be maintained at a predetermined temperature for a predetermined time using steam, thereby increasing the sterilization effect of such bedclothes.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a laundry treating apparatus may include a tub to store water, a drum provided in the tub to accommodate laundry, a drive unit coupled to the tub to rotate the drum, and a controller to detect vibration of the drum.

In accordance with one aspect of the present disclosure, a method for controlling a laundry treatment apparatus which includes a drum in which a target object to be dried is put, a drum motor to drive the drum, an air duct to guide air into the drum, a heat pump provided in the air duct to dehumidify and heat the air, a blower fan to move the air of the air duct, and a blower motor to drive the blower fan, the method includes a drum driving step for repeatedly driving the drum by accelerating and decelerating the drum, a steam supply step for supplying or stopping steam for a predetermined time during execution of the drum driving step, and an air supply step for circulating internal air of the drum during execution of the drum driving step, wherein the circulation of the internal air of the drum is stopped during execution of the steam supply step.

The method may further include selecting a drying course prior to the drum driving step, wherein the steam supply step is performed when a course of drying bedclothes is selected.

The air supply step may be performed after lapse of the predetermined time.

The air supply step may include stopping the heat pump and the blower motor for the predetermined time.

The heat pump is stopped prior to the steam supply step, and the blower motor is stopped after the steam supply step is started.

During execution of the steam supply step, the heat pump and the blower motor are stopped. After completion of the steam supply step, the heat pump and the blower fan are started.

During execution of the steam supply step, the blower motor is temporarily operated and is then stopped. After completion of the steam supply step, the blower motor may start operation.

After completion of the steam supply step, the blower motor is operated again, and the blower motor is operated after the blower motor is operated.

The drum driving step may include a first motion in which the drum rotates at a first revolutions per minute (RPM) value where the target object to be dried is tumbled in a lower region of a horizontal line passing through a center of rotation of the drum, a third motion in which the drum rotates at a third RPM value where the target object to be dried remains in close contact with a circumferential surface of the drum, and a second motion in which the drum rotates at a second RPM value that is higher than the first RPM value of the first motion and is lower than the third RPM value of the third motion.

The drum driving step may include sequentially performing the first motion, the second motion, the third motion, the second motion, and the first motion.

The second motion may include rotating the drum at a revolutions per minute (RPM) value where a target object located in a lower region of the horizontal line passing through the center of rotation of the drum drops from an upper region of the horizontal line to the lower region of the horizontal line.

In accordance with one another aspect of the present disclosure, a method for controlling a laundry treatment apparatus which includes a drum in which a target object to be dried is put, a drum motor to drive the drum, an air duct to guide air into the drum, a heat pump provided in the air duct to dehumidify and heat the air, a blower fan to move the air of the air duct, and a blower motor to drive the blower fan, the method may include a course selection step for selecting a course of drying bedclothes, a drum driving step in which the drum is accelerated and decelerated in the bedclothes drying course so that the drum is repeatedly driven in forward and backward directions, a steam supply step for supplying steam for a predetermined time during execution of the drum driving step, and an air supply step in which the air circulates in the drum, after completion of the steam supply step.

The steam supply step may include stopping the heat pump and the blower motor for the predetermined time.

The heat pump may be stopped prior to the steam supply step, and the blower motor may be stopped after the steam supply step is started.

During execution of the steam supply step, the heat pump and the blower motor may be stopped. After completion of the steam supply step, the heat pump and the blower fan may be started.

During execution of the steam supply step, the blower motor is temporarily operated and is then stopped, and after completion of the steam supply step, the blower motor starts operation.

After completion of the steam supply step, the blower motor is operated again.

The blower motor is operated after the blower motor is operated.

The drum driving step may include a first motion in which the drum rotates at a first revolutions per minute (RPM) value where the target object to be dried is tumbled in a lower region of a horizontal line passing through a center of rotation of the drum, a third motion in which the drum rotates at a third RPM value where the target object to be dried remains in close contact with a circumferential surface of the drum, and a second motion in which the drum rotates at a second RPM value that is higher than the first RPM value of the first motion and is lower than the third RPM value of the third motion.

The drum driving step may include sequentially performing the first motion, the second motion, the third motion, the second motion, and the first motion.

The second motion may include rotating the drum at a revolutions per minute (RPM) value where a target object located in a lower region of the horizontal line passing through the center of rotation of the drum drops from an upper region of the horizontal line to the lower region of the horizontal line It is to be understood that both the foregoing general description and the following detailed description of the present disclosure are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Reference will now be made in detail to the embodiments of the present disclosure, examples of which are illustrated in the accompanying drawings. Wherever possible, the same reference numbers will be used throughout the drawings to refer to the same or similar parts. A singular expression may include a plural expression unless otherwise stated in the context. In the following description, a detailed description of related known configurations or functions incorporated herein will be omitted to avoid obscuring the subject matter.

In the following description of the present disclosure, names of constituent components to be defined are determined in consideration of their functions. Accordingly, it should be understood that the following description should not be construed as limiting technical components of the present disclosure. In addition, names of the constituent elements defined in the present disclosure can also be called other names by those skilled in the art.

A laundry treatment apparatus and a method for controlling the same according to embodiments of the present disclosure will hereinafter be described with reference to the attached drawings.

Figure 1:
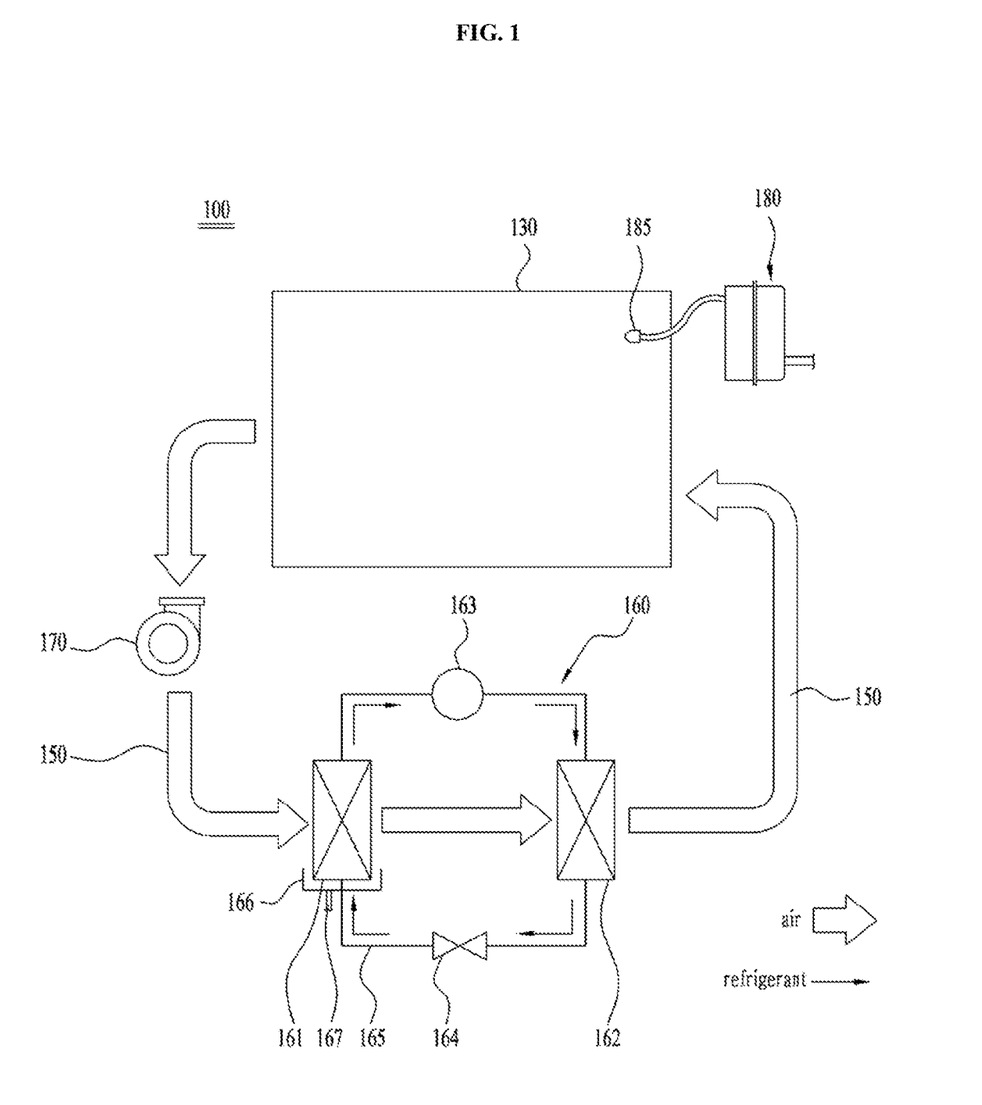
FIG. 1 is a schematic diagram illustrating a laundry treatment apparatus according to an embodiment of the present disclosure.
Figure 2:
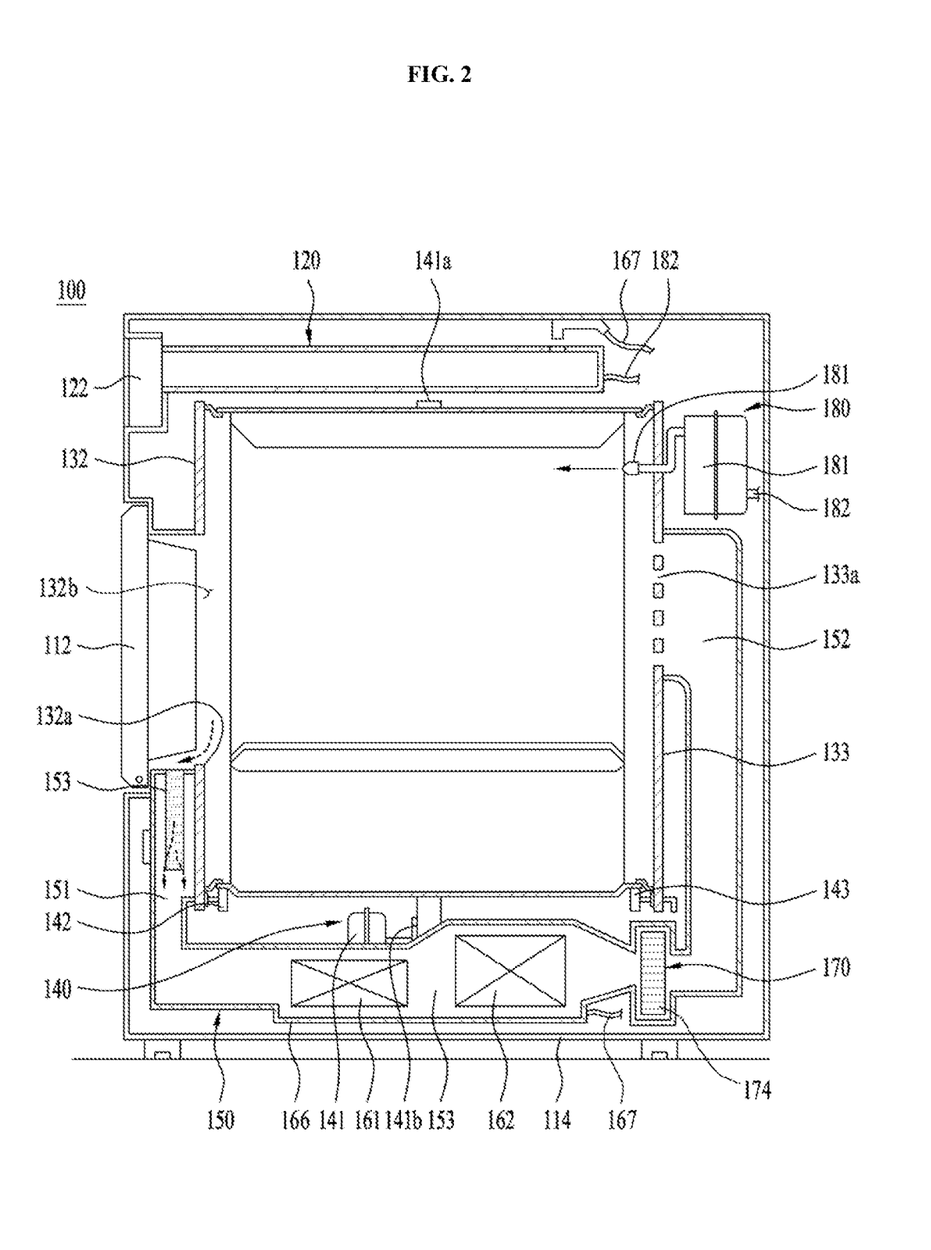
FIG. 2 is a cross-sectional view illustrating an internal structure of the laundry treatment apparatus according to an embodiment of the present disclosure.
Figure 3:
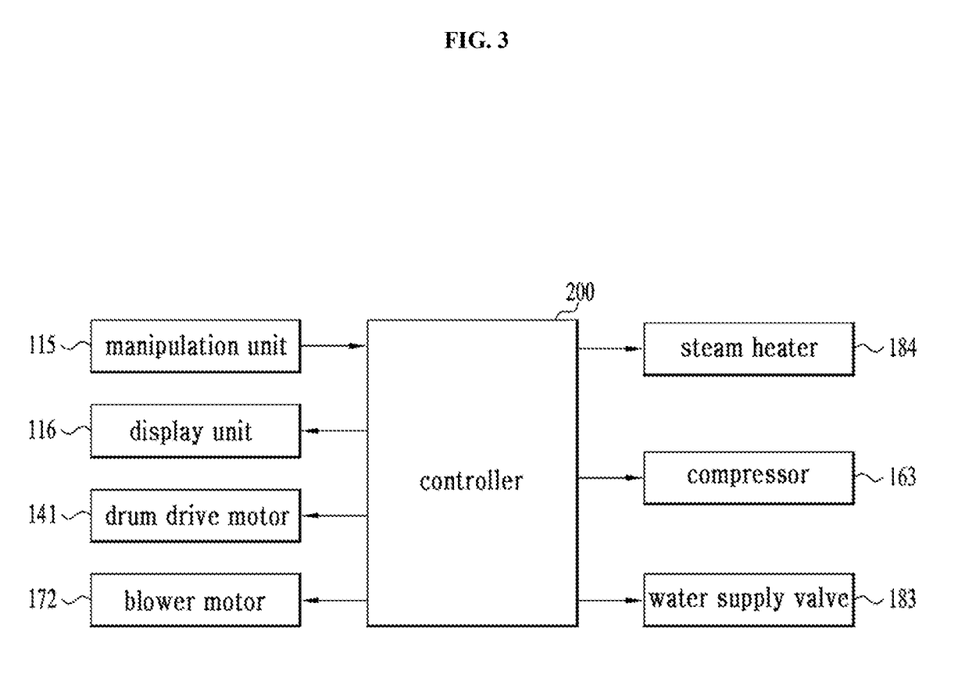
FIG. 3 is a block diagram illustrating a laundry treatment apparatus according to an embodiment of the present disclosure.

FIG. 1 is a schematic diagram illustrating a laundry treatment apparatus according to an embodiment of the present disclosure. FIG. 2 is a cross-sectional view illustrating an internal structure of the laundry treatment apparatus according to an embodiment of the present disclosure. FIG. 3 is a block diagram illustrating a laundry treatment apparatus according to an embodiment of the present disclosure.

The laundry treatment apparatus 100 shown in FIGS. 1 to 3 exemplarily illustrates a drum-type drying machine. The laundry treatment apparatus 100 may include a cabinet 100, a drum 130, a drum driver 140, a blower 170, a heat pump 160, and a steam generator 180. Air from the drum 130 may flow into the heat pump 160 through an air duct 150.

In this case, the cabinet 110 forming external appearance of the product may include a door 112 through which laundry is put in and taken out, and a base 114 in which internal constituent elements of the laundry treatment apparatus 100 are installed.

On the other hand, one end of a front upper part of the cabinet 110 may be provided with a manipulation unit 115 and a display unit 116 to control the laundry treatment apparatus 100. The other end of the front upper part of the cabinet 110 may be provided with a condensate tank 120 configured to temporarily store condensate water generated by the heat pump 160.

Here, the display unit 116 may be configured to display various drying courses based on types of target clothes, and the manipulation unit 115 may be configured to select a drying course displayed on the display unit 116. Thus, a controller 200 may enable the drying course selected by the manipulation unit 115 to be displayed on the display unit 116, and may control the respective constituent components of the laundry treatment apparatus 100 to perform the drying course.

On the other hand, the above-mentioned drying source may include a bedclothes drying course for drying bedclothes. The bedclothes drying course may include a bedclothes normal-drying course in which no steam is used, and a bedclothes steam-drying course in which steam is used.

In this case, during the bedclothes normal-drying course, wrinkle removal, deodorization, static electricity removal, etc. of bedclothes can be performed without using steam. During the bedclothes steam-drying course, steam is supplied to the laundry treatment apparatus, such that it is expected that the sterilization effect of bedclothes as well as wrinkle removal, deodorization, and static electricity removal of bedclothes can be acquired.

Meanwhile, the condensate tank 120 may be formed in a drawer shape to be drawn out of the cabinet 110. A separate knob 122 may be disposed at the front side of the condensate tank 120. Therefore, as the condensate water is stored in the condensate tank 120, the condensate tank 120 can be withdrawn by a user so that the condensate water can be drained outside.

In addition, the condensate tank 120 may further include a supply pipe 124 for enabling the condensate water stored in the condensate tank 120 to flow into a steam generator 180 to be described later.

On the other hand, the drum 130 may rotate about a rotary shaft that is disposed in the cabinet either in a horizontal direction or in a diagonal direction inclined at a predetermined angle. The drum 130 may be formed in a hollow cylindrical shape, and may form an accommodation space in which laundry or bedclothes to be dried are put by a user so that the laundry and bedclothes can be dried in the accommodation space.

The drum 130 may be formed in a cylindrical shape in which a front end and a rear end are opened. The drum 130 may include a front support 132 through which the drum 130 can be rotatably supported at a front part of the drum 130. In addition, the drum 130 may include a rear support 133 through which the drum 130 can be rotatably supported at a rear end.

In addition, a front roller 142 for rotatably supporting the drum 130 may be provided at a front lower part of the drum 130, and a rear roller 143 for rotatably supporting the drum 130 may be provided at a rear lower part of the drum 130.

That is, the front support 132 may block the front side of the drum 130, and the rear support 133 may block the rear side of the drum 130, such that the front support 132 and the rear support 133 can form a drying space of target laundry to be dried and can respectively support the front end and the rear end of the drum 130.

Meanwhile, an inlet 132b through which target laundry to be dried can be put into the drum 130 may be formed at the front support 132, and the inlet 132b may be selectively opened or closed by the door 112.

In addition, an air outlet 132a connected to an air duct 150 to be described later may be disposed below the front support 132. The air outlet 132a may be provided with a suction passage 151 of the air duct 150 to be described layer, so that the suction passage 151 can communicate with the air outlet 132a.

The rear support 133 may be provided with an air inlet 133a formed of a plurality of through-holes to supply air to the drum 130. The air inlet 133a may be provided with an exhaust passage 152 of the air duct 150, such that the exhaust passage 152 can communicate with the air inlet 133a.

In order to efficiently dry target laundry to be dried, an inner circumferential surface of the drum 130 may be provided with a lifter 131a for tumbling laundry placed in the drum 130.

In addition, the drum driver 140 may provide rotational force to the drum 130 using the drum motor 141. An output shaft of the drum motor 141 and the drum 130 may be coupled to each other by a power transmission means such as a belt 141*a* and a pulley 141*b*. Rotational force of the drum motor 141 may be transmitted to the drum 130, so that the drum 130 can rotate.

The air duct 150 may be connected to the drum 130, resulting in formation of a closed loop for air circulation. For example, the air duct 150 may be formed in a duct shape.

In this case, the suction passage 151 for discharging air may be provided below the front support 132, and an exhaust passage 152 for supporting air may be formed in the rear support 133.

Meanwhile, the blower 170 may be installed in the air duct 150 extending from the suction passage 151 to an evaporator 161 of the heat pump 160, or may be installed in the air duct 160 extending from the condenser 16 of the heat pump 160 to the exhaust passage 152.

In this case, the blower 170 may include a blower fan 174 driven by a separate blower motor 172, may provide kinetic energy to air so that the air can pass through the drum 130, and may thus enable the air discharged from the drum 130 to re-circulate in the drum 130.

The laundry treatment apparatus 100 may include a drum motor 141 for rotating the drum 130 and a separate blower motor 172 for driving the blower fan 174.

In this case, the laundry treatment apparatus 100 can individually control rotation of the drum 130 and operation of the blower fan 174 according to individual control of the drum motor 141 and the blower fan 172.

In addition, the suction passage 151 may be provided with a lint filter 153 for filtering out lint in the circulated air. The lint filter 153 may collect lint contained in air as the air sucked into the suction passage passes through the drum 130.

Accordingly, moisture of target laundry may be evaporated by hot air supplied into the drum 130, and the air having passed through the drum 130 may include moisture evaporated from the target laundry and at the same time may be discharged outside from the drum 130.

In this case, high-temperature and humid air discharged from the drum 130 may be dehumidified and heated while moving along the air duct 150, so that the resultant air can circulate in the drum 130.

On the other hand, the heat pump 160 may include an evaporator 161, a compressor 163, a condenser 16, and an expansion valve 164. The heat pump 160 may use refrigerant as an operation fluid. The refrigerant may flow along a refrigerant pipe 165, and the refrigerant pipe 165 may form a closed loop for refrigerant circulation.

As the evaporator 161, the compressor 163, the condenser 16 and the expansion valve 164 are connected to the refrigerant pipe 165, the refrigerant may sequentially pass through the evaporator 161, the compressor 163, the condenser 16 and the expansion valve 164.

The evaporator 161 may be installed in the air duct 150 to communicate with the outlet of the drum 130, and may enable the air discharged from the drum outlet to exchange heat with the refrigerant, so that the evaporator 161 can collect heat of the air discharged from the drum 130 without discarding the heat to the outside of the drying machine.

The condenser 16 may be installed in the air duct 150 to communicate with the inlet of the drum, and may enable the air having passed through the evaporator 161 to exchange heat with the refrigerant, so that the condenser 16 can emit heat of the refrigerant having passed through the evaporator 161 to air to be introduced into the drum 130.

Meanwhile, the evaporator 161 and the condenser 16 may be installed in the air duct 150. The evaporator 161 may be connected to the outlet of the drum 130, and the condenser 16 may be connected to the inlet of the drum 130.

High-temperature and humidity air discharged from the drum 130 has a higher temperature than the refrigerant of the evaporator 161. Accordingly, heat capacity of the high-temperature and humid air is absorbed in the refrigerant of the evaporator 161 while passing through the evaporator 161, so that the resultant air is condensed to generate condensate water. Therefore, the high-temperature and humid air may be dehumidified by the evaporator 141, and the condensate water may be collected into a separate condensate tank 120.

In order to collect the condensate water generated by the evaporator 161 in the condensate tank 120, a condensate collection plate 166 may be provided below the evaporator 161. The condensate collection plate 166 and the condensate tank 120 may further include a condensate pipe 167 and a condensate pump (not shown) so as to allow the condensate water collected into the condensate collection plate 166 to flow into the condensate tank 120.

On the other hand, a heat source of the air absorbed by the evaporator 161 may move to the condenser 16 using the refrigerant as a medium, and the compressor 163 may be disposed between the evaporator 161 and the condenser 16 so as to move the heat source in the direction from the evaporator 161 acting as a low heat source to the condenser 163 acting as a high heat source.

Each of the evaporator 161 and the condenser 16 may be a fin & tube type heat exchanger. The fin & tube type heat exchanger may have a structure in which fins formed in flat plate shapes are attached to a hollow tube.

As a refrigerant flows along the inside of the tube and air passes between the fins, so that the refrigerant and the air can exchange heat with each other. In this case, the fins may be used to increase the size of a heat exchange region between the air and the refrigerant.

The compressor 163 may generate a high-temperature and high-pressure refrigerant by compressing refrigerant evaporated by the evaporator 161, and the high-temperature and high-pressure refrigerant may flow into the condenser 16 along the refrigerant pipe 165. The compressor 163 may be an inverter-type compressor 163 capable of varying a frequency so as to control the discharge amount of the refrigerant.

The expansion valve 164 may be installed at the refrigerant pipe 165 extending from the condenser 16 to the evaporator 161, and may expand the refrigerant condensed by the condenser 16, such that the low-temperature and low-pressure refrigerant can be transferred to the evaporator 161.

The above-mentioned refrigerant can move or flow along the following flow passage. In more detail, the refrigerant in a gaseous state may flow into the compressor 163, may be converted into a state of high temperature and high pressure by compression of the compressor 163, and the high-temperature and high-pressure refrigerant may flow into the condenser 16 in a manner that heat of the refrigerant is emitted to the air, so that the refrigerant can be converted a liquid state from the gaseous state.

Subsequently, the liquid refrigerant may be introduced into the expansion valve 164, and may be converted into a low-temperature and low-pressure refrigerant by a throttling operation of the expansion valve 164 (or a capillary tube). The low-temperature and low-pressure liquid refrigerant may flow into the evaporator 161 so that the evaporator 161 can absorb heat from the air to convert the liquid refrigerant into a gaseous refrigerant.

As described above, the heat pump 160 may sequentially circulate a refrigerant to the compressor 163, the condenser 16, the expansion valve 164, and the evaporator 161 in a repeated manner, and may provide a heat source to the air that circulates in the drum 130.

On the other hand, the laundry treatment apparatus 100 according to the present disclosure may include a steam generator 180 for supplying high-temperature stream to the inside of the drum 130, differently from a process of circulating and supplying heated air by the heat pump 160. As a result, the laundry treatment apparatus 100 can perform wrinkle removal, deodorization, static electricity removal, and sterilization of target laundry using the steam generator 180.

In this case, the steam generator 180 may include a steam chamber 181, a steam heater (not shown), and a steam nozzle 185. The steam chamber 181 may store water needed to generate steam, and may include a space in which water is heated. The steam heater (not shown) may be disposed in the steam chamber 181, and may generate steam by heating water stored in the steam chamber 181. The steam nozzle 185 may spray the steam generated by the steam chamber 181 into the drum 130.

In this case, the steam chamber 181 may include a steam water-supply pipe 183 to receive water needed to generate steam. The steam water-supply pipe 182 may directly receive water from an external water-supply source (not shown) of the laundry treatment apparatus 100, or may receive condensate water stored in the condensate tank 120. The steam water-supply pipe 182 may further include a water-supply valve 183 to control water to be supplied to the steam chamber 181.

Operations of the above-mentioned laundry treatment apparatus according to the embodiment of the present disclosure will hereinafter be described with reference to the attached drawings. The following constituent elements of the laundry treatment apparatus should be understood with reference to the foregoing description and the attached drawings.

Figure 4:
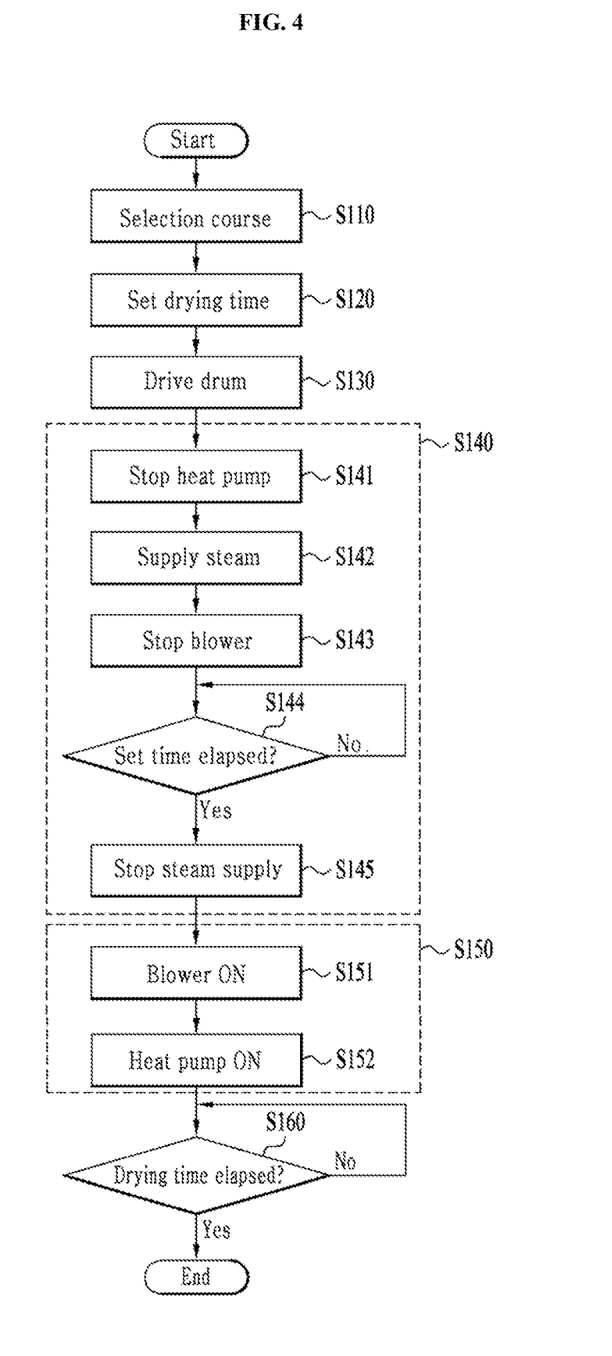
FIG. 4 is a flowchart illustrating a method for controlling the laundry treatment apparatus according to an embodiment of the present disclosure.
Figure 5:
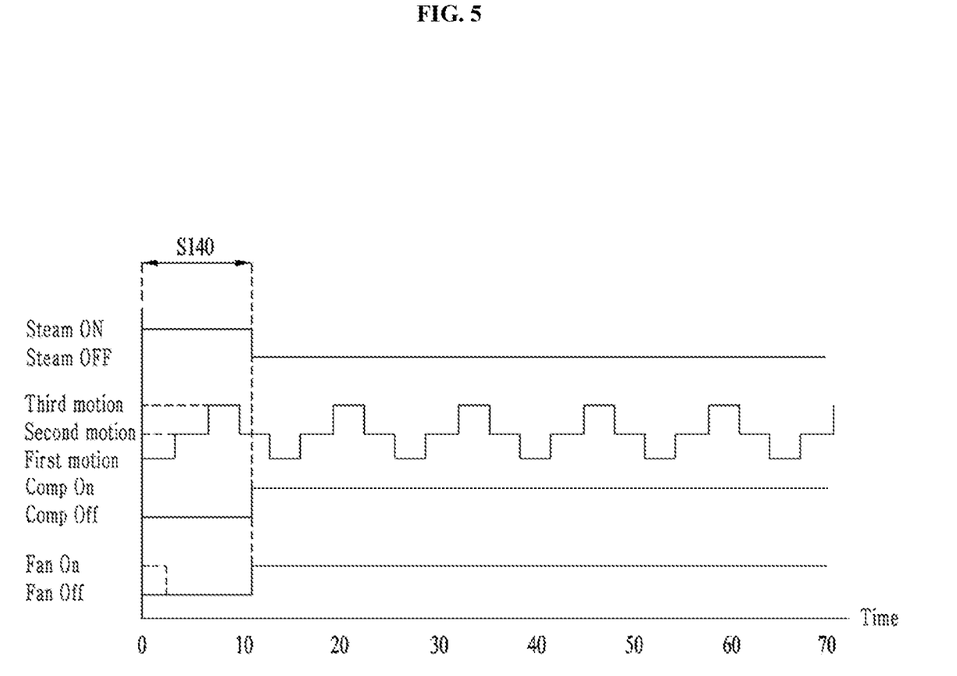
FIG. 5 is a graph illustrating a method for operating the laundry treatment apparatus according to an embodiment of the present disclosure.

FIG. 4 is a flowchart illustrating a method for controlling the laundry treatment apparatus according to an embodiment of the present disclosure. FIG. 5 is a graph illustrating a method for operating the laundry treatment apparatus according to an embodiment of the present disclosure.

Although the method for controlling the laundry treatment apparatus according to the present disclosure is used to dry or treat target laundry such as clothes or bedclothes, the scope or spirit of the present disclosure is not limited thereto, and the embodiments of the present disclosure provide a method for performing wrinkle removal, deodorization, static electricity removal, dust removal, and sterilization of bedclothes by supplying steam to the bedclothes when drying the bedclothes.

The method for controlling the laundry treatment apparatus may include a course selection step S110 for receiving a control signal needed for course selection from the user, a drying time setting step S120 for setting a drying time needed to set an execution time of a user-selected course, a drum driving step S130 for rotating the drum 130 by accelerating or decelerating the drum at a predetermined speed, a steam supply step S140 for supplying steam to the inside of the drum 130, and an air supply step for removing moisture from target laundry by supplying air to the drum 130.

In this case, the course selection step S110 is a step of enabling the user to select a desired course from among a plurality of drying courses displayed through the manipulation unit 115 and the display unit 116. In the course selection step S110, the controller 200 may set a drying course based on information received through the manipulation unit 115. For convenience of description and better understanding of the present disclosure, it is assumed that a drying course selected by the user who uses the manipulation unit 115 is exemplarily set to a bedclothes drying course.

Meanwhile, the drying time setting step S120 may set the time required for the user-selected drying course. The drying time for each drying course may be set by the controller 200 according to the amount of target laundry placed in the drum 130. Alternatively, the controller 200 may be provided to select the time allocated to the user-selected drying course from among the plurality of drying times of individual drying courses set by a manufacturing company.

The drum driving step S130 may enable target laundry to move in the drum by controlling the number of rotations (e.g., RPM) of the drum 130, or may enable target laundry to be fixed at the circumferential surface of the drum 130 by controlling the number of rotations (e.g., RPM) of the drum 130. Thus, in the drum driving step S130, the size of a contact region between the target laundry to be dried and the air can be changed, and at the same time the size of a contact region between target laundry and steam to be supplied into the drum 130 can be changed, so that steam can deeply penetrate the target laundry.

In addition, the drum driving step S130 may be intermittently repeated at regular intervals during the steam supply step S140 and the air supply step S150.

Meanwhile, the drum driving step S130 may include a first motion, a second motion, and a third motion that sequentially accelerate and decelerate a rotational speed of the drum 130 in the order of a first agitation speed→a second agitation speed→a third agitation speed, such that target laundry placed in the drum 130 can be rotatably agitated sequentially.

In this case, the first motion, the second motion, and the third motion can be distinguished from each other depending on RPMs of the drum 130. The drum 103 may rotate at the lowest RPM in the first motion. The drum 103 may rotate at the highest RPM in the third motion. In the second motion, the drum 130 may rotate at RPM between the RPM of the first motion and the RPM of the third motion.

On the other hand, the first motion may refer to a motion that allows the drum 130 to rotate at a first RPM (about 35~45 rpm), such that target laundry tumbles under a horizontal line passing through the center of rotation of the drum 130.

When the first motion is executed, target laundry may move along the inner circumferential surface of the drum in a space located below the horizontal line from among the inner space of the drum 130, so that the target laundry can repeatedly tumble in the drum 130 through the first motion.

Accordingly, one surface (i.e., the surface contacting the inner circumferential surface of the drum) of target laundry contacting the inner circumferential surface of the drum 130 may be separated from the circumferential surface of the drum 130 through the first motion, such that the target laundry can rotate and move in a manner that a relatively larger region of the target laundry can be in contact with the air or steam flowing into the drum 130.

On the other hand, the second motion may refer to a motion in which the drum 130 rotates at a second RPM (about 45~55 rpm) between the first RPM allocated to the first motion and the third RPM allocated to the third motion.

In this case, when the second motion is executed, as target laundry rotates at the second RPM, target laundry may move to an upper region of a horizontal line that passes through the center of rotation of the drum 130 from among the inner space of the drum 130 by centrifugal force, and may then drop to the lower region of the horizontal line passing through the center of rotation of the drum 130, so that target laundry is repeatedly tumbled in the drum during the second motion.

Accordingly, as target laundry drops from the upper region of the drum 130 to the lower region in the drum 130, moisture contained in the target laundry colliding with the circumferential surface of the drum 130 can be easily separated from the target laundry to increase mobility of the target laundry, such that steam supplied into the drum separately from the air can penetrate the inside of the target laundry.

On the other hand, the third motion may refer to a motion that allows the drum 130 to rotate at a third RPM (about 55~65 rpm) that causes centrifugal force of 1G or more to the target laundry, so that the target laundry can be in close contact with the circumferential surface of the drum 130.

In the third motion, since target laundry is maintained fixedly at the circumferential surface of the drum 130 by centrifugal force, target laundry does not drop even when the drum 130 rotates. The third motion provides target laundry with high centrifugal force, so that moisture contained in the target laundry to be dried can be separated from the target laundry.

In the third motion, the centrifugal force generated by rotation of the drum 130 may be applied to air or steam staying in target laundry that rotates while being attached to the inner circumferential surface of the drum 130, such that the air or steam to which the centrifugal force is applied can deeply penetrate the inside of the target laundry.

On the other hand, in the first, second, and third motions as described above, drying of target laundry may be repeatedly performed at intervals of a predetermined time. As the first, second, and third motions proceed, dust and the like remaining on target laundry placed in the drum 130 can be removed from the target laundry, and the air or steam inside the drum 130 can evenly contact and penetrate the target laundry.

In association with the first, second, and third motions, the first to third motions may be combined with each other in ascending numerical order of RPMs of the drum 130, or may be combined with each other in descending numerical order of RPMs of the drum 130, such that load of the drum driver 140 can be minimized.

The drum driving step S130 may be repeated until the drying time is completed. That is, the control method of the laundry treatment apparatus according to the present disclosure may be repeatedly performed until the drying time has elapsed from the time where the steam supply step S140 and the air supply step S150 are started.

In addition, the first motion, the second motion, and the third motion can operate separately from operation of the blower fan 170, by the drum motor 141 configured to drive the drum 130. That is, when the drum motor 141 rotates the drum 130 at different RPMs of the first to third motions, the blower motor 172 rotates the blower fan 174 at a constant speed so that the air can constantly circulate in the drum 130.

On the other hand, the first, second, and third motions can be more effectively applied to a course (i.e., a bedclothes course) of drying bedclothes such as a blanket. Since bedclothes such as a blanket are thick and have a large volume, the bedclothes may hardly move in the drum 130 even when the drum 130 rotates.

In this case, when air is supplied to the drum 130 in a situation where the position of bedclothes remains unchanged, there may arise some problems in which a portion contacting the air from among the bedclothes is dried and the other portion not contacting the air from among the bedclothes is not dried. If the first, second, and third motions are performed in the drum driving step S130 after the bedclothes drying course is selected, the above-mentioned problems can be obviated.

Meanwhile, after completion of the drum driving step S130, the steam supply step S140 for supplying steam to the inside of the drum 130 may be performed. The steam supply step S140 may be used to perform wrinkle removal, deodorization, static electricity removal, and sterilization of target laundry placed in the drum 130.

In this case, the steam supply step S140 may further include a heat-pump stopping step S141 and a blower stopping step S143. That is, in a situation where steam is supplied to the drum 130 through the steam generator 180, when power is supplied to the steam heater 184 to generate steam and at the same time such power is also supplied to the heat pump 160 and the compressor 163, excessive power may be consumed in the process of drying target laundry and supplying steam to the target laundry.

Thus, in accordance with the embodiment of the present disclosure, during execution of the steam supply step S140, the heat pump 160 or the blower 170 may temporarily stop operation. However, when the sufficient amount of power is supplied to the laundry treatment apparatus 100, the heat pump 160 and/or the blower 170 can continuously operate even when steam is supplied to the drum 130.

On the other hand, the operation of the heat pump 160 and the operation of the blower 170 in the steam supply step S140 will be described later with reference to a separate drawing. In the following description, the embodiment of the present disclosure will hereinafter be described with reference to the process of stopping the heat pump 160 and the blower 170 in the steam supply step S140.

Meanwhile, if the steam supply step S140 is performed as described above, the compressor 166 of the heat pump 160 stops operation (S141) and at the same time the blower 170 also stops operation (S143), and steam is supplied to the inside of the drum 130 through the steam generator (S142).

In this case, in the steam supply step S140, when steam is supplied at the same time as the heat pump starts operation, excessive power is consumed so that simultaneous execution of both steam supply and heat pump operation is considered undesirable. Steam supplied to the drum in an activation state of the blower may circulate in the drum along with the air, and the steam may have difficulty in contacting target laundry. Therefore, it is desirable that the blower stop operation in the steam supply step S140.

On the other hand, the operation time of the blower 170 may also overlap with an initial steam supply time of the steam supply step S140 for a predetermined time. That is, in the initial stage of the steam supply step S140, steam may be sprayed only to a specific portion where the steam nozzle 185 is located, and may thus be unevenly sprayed into the drum 130.

Therefore, in the steam supply step S140, the blower 170 may operate for an initial constant time to evenly diffuse the steam sprayed from the steam nozzle 185 into the drum 130.

Thereafter, when the compressor 166 of the heat pump 160 and the blower motor 172 of the blower 160 are stopped in the steam supply step S140, the controller 200 may determine whether a set time for steam supply has elapsed (S144).

In this case, the set time for steam supply may vary depending on the amount of initial laundry to be dried. When the set time has not elapsed, steam is continuously supplied to the drum 130. In contrast, when the set time has elapsed, the steam generator is powered off so that the process of supplying steam to the drum 130 is stopped (S140).

Thereafter, after the steam supply operation is stopped, the controller 200 may circulate the air in the drum 130 by powering on the blower 170 (S151), and may heat the air circulating in the drum 130 to supply hot air by powering on the heat pump 160 (S152), thereby drying target laundry. Here, before power is supplied to the heat pump 160, the blower 170 is powered on earlier than the heat pump 160, so that steam remaining in the drum 130 may be discharged outside.

Thereafter, the controller 200 may determine whether the drying time determined in the drying time setting step S120 has elapsed (S160). In this case, when the drying time has not elapsed, the blower 170 and the heat pump 160 are continuously operated. In contrast, when the drying time has elapsed, the blower 170 and the heat pump 160 are stopped and the drying process is completed.

The process of operating the laundry treatment apparatus 100 according to another embodiment of the present disclosure will hereinafter be described with reference to the attached drawings.

Figure 6:
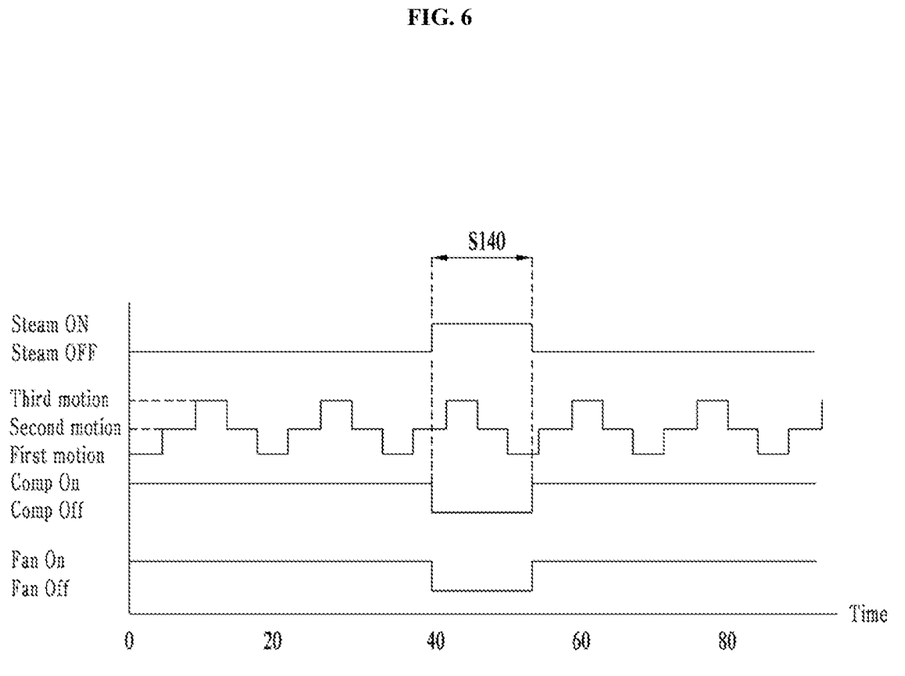
FIG. 6 is a graph illustrating a method for operating the laundry treatment apparatus according to another embodiment of the present disclosure.

FIG. 6 is a graph illustrating a method for operating the laundry treatment apparatus according to another embodiment of the present disclosure.

The operations of the laundry treatment apparatus 100 shown in FIG. 6 according to another embodiment may be identical to those of the above-mentioned laundry treatment apparatus according to one embodiment. The steam supply step S140 may be performed after the air supply step S150 has been performed for a predetermined time.

In the following description, the same operations as in the above-mentioned embodiment will herein be omitted for brevity, and only a specific time where the steam supply step S140 is performed after completion of the drum driving step S130 will hereinafter be described.

The control method of the laundry treatment apparatus 100 according to another embodiment may operate as follows. In more detail, after the set time (about 35~45 minutes) has elapsed after completion of the drum driving step S130, the steam supply step S140 is then performed.

In this case, the controller 200 can perform a general drying procedure by supplying power to the heat pump 160 and the blower 170 during execution of the drum driving step S130. Thereafter, the steam supply step S140 may be performed after lapse of a predetermined time.

In this case, when the steam supply step S140 is performed, the heat pump 160 and the blower 170 may stop operation in the same manner as in the above-mentioned embodiment, and only steam can be supplied to the drum through the steam generator 180.

In other words, when the drying procedure is performed on target laundry for a set time, moisture or humidity remaining in bedclothes to be dried can be heated and dried by hot air. Therefore, if the steam supply step S140 is performed after lapse of the set time, steam supplied to the inside of the drum 130 may be supplied to the inside of the drum 130 heated by hot air, so that steam can be evenly diffused into the drum 130 and moisture remaining in bedclothes to be dried may be removed, and steam can deeply penetrate the bedclothes through a dried portion of the bedclothes.

A method for operating the laundry treatment apparatus 100 according to still another embodiment of the present disclosure will hereinafter be described with reference to the attached drawings.

Figure 7:
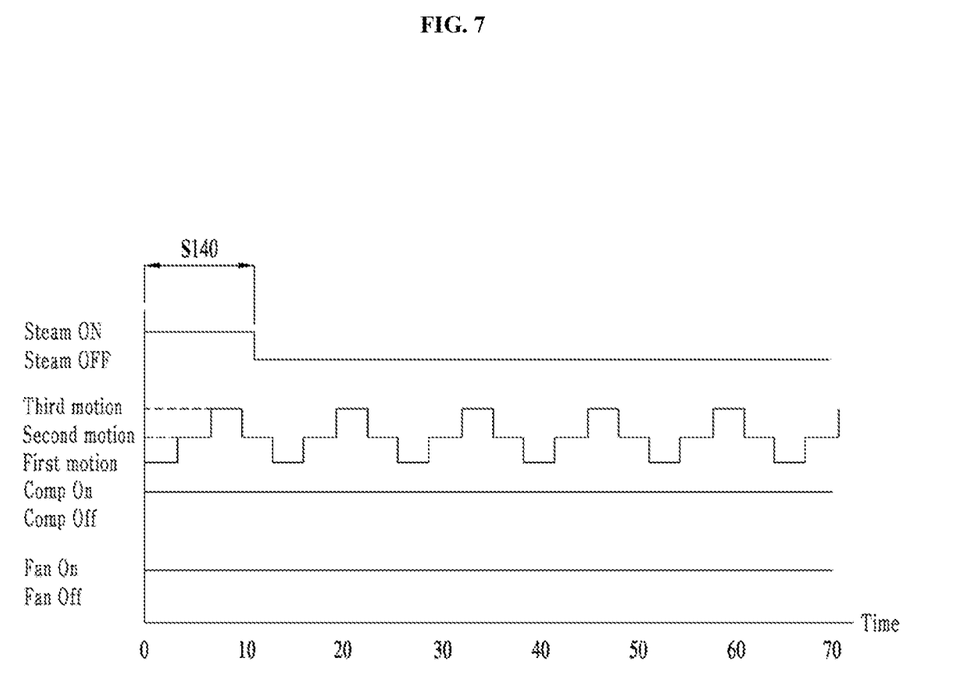
FIG. 7 is a graph illustrating a method for operating the laundry treatment apparatus according to still another embodiment of the present disclosure.

FIG. 7 is a graph illustrating a method for operating the laundry treatment apparatus according to still another embodiment of the present disclosure.

In accordance with still another embodiment of the present disclosure, if it is possible for the sufficient amount of power to be supplied to the laundry treatment apparatus so that the laundry treatment apparatus is sufficiently operable with the sufficient amount of power, the steam supply step S140 and the air supply step S150 can be simultaneously performed.

As shown in FIG. 7, in accordance with still another embodiment of the present disclosure, when the drum driving step S130 is performed, the air supply step S150 may be performed in the same manner as the drum driving step S130. For an initial set time in which the drum driving step S130 and the air supply step S150 are performed, the steam supply step S140 may be performed.

In this case, steam supplied to the inside of the drum 130 is supplied to the inside of the drum 130 along with the air, such that steam can be evenly diffused into the drum 130 and moisture remaining in bedclothes to be dried is removed, and the resultant steam can deeply penetrate the bedclothes through a dried portion of the bedclothes.

As described above, in association with the method for controlling the laundry treatment apparatus according to the above-mentioned embodiments of the present disclosure, during drying of bedclothes such as a blanket, steam is supplied to the bedclothes, such that not only drying of the bedclothes, but also wrinkle removal, deodorization, static electricity removal, dust removal, and sterilization of the bedclothes can be effectively performed.

In addition, in association with the method for controlling the laundry treatment apparatus according to the above-mentioned embodiments of the present disclosure, during drying of bedclothes such as a blanket, steam is supplied to the bedclothes, such that the internal temperature of the bedclothes can be maintained at a predetermined temperature for a predetermined time, thereby increasing the sterilization effect of such bedclothes.

Although the above-mentioned control method has been disclosed with reference to the laundry treatment apparatus including the circulation-type drying system shown in FIG. 1 for convenience of description, the scope or spirit of the present disclosure is not limited thereto, and the control method according to the present disclosure can also be applied to another laundry treatment apparatus including an exhaust-type drying system.

That is, the laundry treatment apparatus including the exhaust-type drying system may include the drum 130, an exhaust duct through which internal air in the drum 130 is discharged outside, a supply duct through which external air is supplied to the drum 130, a fan provided in the exhaust duct, and a heat exchange unit (e.g., a heater) provided in the exhaust duct. The control method according to the present disclosure can also be applied to the laundry treatment apparatus including the exhaust-type drying system.

As is apparent from the above description, the method for controlling the laundry treatment apparatus according to the embodiments of the present disclosure can supply steam to bedclothes when drying the bedclothes such as a blanket, such that the laundry treatment apparatus can dry the bedclothes using steam, and at the same time can perform wrinkle removal, deodorization, static electricity removal, dust removal, sterilization, etc. of bedclothes using steam.

The method for controlling the laundry treatment apparatus according to the embodiments of the present disclosure can supply steam to bedclothes when drying the bedclothes such as a blanket, such that the laundry treatment apparatus enables an internal temperature of the bedclothes to be maintained at a predetermined temperature for a predetermined time using steam, thereby increasing the sterilization effect of bedclothes.

It will be apparent to those skilled in the art that various modifications and variations can be made in the present disclosure without departing from the spirit or scope of the inventions. Thus, it is intended that the present disclosure covers the modifications and variations of this invention provided they come within the scope of the appended claims and their equivalents.

What is claimed is:

1. A method for controlling a laundry treatment apparatus, the laundry treatment apparatus including a drum configured to receive a target object to be dried, a drum motor configured to drive the drum, an air duct configured to guide air into the drum, a heat pump disposed in the air duct and configured to dehumidify and heat the air, a blower fan configured to move the air in the air duct, and a blower motor configured to drive the blower fan, the method comprising:
    driving the drum, wherein driving drum comprises repetitively accelerating and decelerating rotation of the drum;
    supplying steam for a predetermined time while driving the drum;
    stopping supply of the steam after the predetermined time while driving the drum;
    circulating internal air of the drum while driving the drum; and
    stopping circulation of the internal air of the drum while supplying the steam.

2. The method according to claim 1, further comprising:
    selecting a drying course prior to driving the drum,
    wherein supplying the steam is performed based on selection of a course of drying bedclothes.

3. The method according to claim 1, wherein circulating the internal air is performed after an elapse of the predetermined time.

4. The method according to claim 1, wherein circulating the internal air comprises:
    stopping operation of the heat pump and the blower motor for the predetermined time.

5. The method according to claim 1, further comprising:
    stopping operation of the heat pump prior to supplying the steam; and
    stopping operation of the blower motor after starting supplying the steam.

6. The method according to claim 1, further comprising:
    stopping operation of the heat pump and the blower motor while supplying the steam; and
    starting operation of the heat pump and the blower motor after completion of supplying the steam.

7. The method according to claim 1, further comprising:
    while supplying the steam, operating the blower motor and then stopping operation of the blower motor; and
    starting operation of the blower motor after completion of supplying the steam.

8. The method according to claim 1, further comprising:
    operating the blower motor after completion of supplying the steam; and
    operating the heat pump after operating the blower motor.

9. The method according to claim 1, wherein driving the drum comprises:
    operating the drum in a first motion in which the drum rotates at a first revolutions per minute (RPM) value such that the target object is tumbled in a lower region below a horizontal line passing through a center of rotation of the drum;
    operating the drum in a second motion in which the drum rotates at a second RPM value greater than the first RPM value; and
    operating the drum in a third motion in which the drum rotates at a third RPM value greater than the second RPM value such that the target object remains in contact with a circumferential surface of the drum.

10. The method according to claim 9, wherein driving the drum further comprises:
    sequentially performing the first motion, the second motion, the third motion, the second motion, and then the first motion.

11. The method according to claim 9, wherein operating the drum in the second motion comprises:
    rotating the drum at the second RPM value such that the target object in the lower region is raised to an upper region above the horizontal line and drops from the upper region to the lower region.

12. A method for controlling a laundry treatment apparatus, the laundry treatment apparatus including a drum configured to receive a target object to be dried, a drum motor configured to drive the drum, an air duct configured to guide air into the drum, a heat pump disposed in the air duct and configured to dehumidify and heat the air, a blower fan configured to move the air in the air duct, and a blower motor configured to drive the blower fan, the method comprising:
    selecting a course of drying, wherein the course of drying includes a course of drying bedclothes;
    driving a drum based on selection of the course of drying bedclothes, wherein driving the drum comprises repetitively accelerating and decelerating rotation of the drum to rotate the drum in forward and backward directions;
    supplying steam for a predetermined time while driving the drum; and
    circulating air in the drum after completion of supplying the steam.

13. The method according to claim 12, further comprising:
    stopping the heat pump and the blower motor while supplying the steam for the predetermined time.

14. The method according to claim 12, further comprising:
    stopping operation of the heat pump prior to supplying the steam; and
    stopping operation of the blower motor after starting supplying the steam.

15. The method according to claim 12, further comprising:
    stopping operation of the heat pump and the blower motor while supplying the steam; and
    starting operation of the heat pump and the blower motor after completion of supplying the steam.

16. The method according to claim 12, further comprising:
   while supplying the steam, operating the blower motor and then stopping operation of the blower motor; and
   starting operation of the blower motor after completion of supplying the steam.

17. The method according to claim 12, further comprising:
   operating the blower motor after completion of supplying the steam; and
   operating the heat pump after operating the blower motor.

18. The method according to claim 12, wherein driving the drum comprises:
   operating the drum in a first motion in which the drum rotates at a first revolutions per minute (RPM) value such that the target object is tumbled in a lower region below a horizontal line passing through a center of rotation of the drum;
   operating the drum in a second motion in which the drum rotates at a second RPM value greater than the first RPM value; and
   operating the drum in a third motion in which the drum rotates at a third RPM value greater than the second RPM value such that the target object remains in contact with a circumferential surface of the drum.

19. The method according to claim 18, wherein driving the drum further comprises:
   sequentially performing the first motion, the second motion, the third motion, the second motion, and then the first motion.

20. The method according to claim 18, wherein operating the drum in the second motion comprises:
   rotating the drum at the second RPM value such that the target object in the lower region is raised to an upper region above the horizontal line and drops from the upper region to the lower region.

* * * * *